United States Patent
Herth

(10) Patent No.: US 11,444,442 B1
(45) Date of Patent: Sep. 13, 2022

(54) ADAPTABLE TOGGLE BOXES

(71) Applicant: Greg Herth, Oakdale, NY (US)

(72) Inventor: Greg Herth, Oakdale, NY (US)

( * ) Notice: Subject to any disclaimer, the term of this patent is extended or adjusted under 35 U.S.C. 154(b) by 0 days.

(21) Appl. No.: 17/690,812

(22) Filed: Mar. 9, 2022

Related U.S. Application Data

(63) Continuation-in-part of application No. 17/475,100, filed on Sep. 14, 2021, now Pat. No. 11,283,253.

(51) Int. Cl.
H02G 3/12 (2006.01)
H02G 3/08 (2006.01)

(52) U.S. Cl.
CPC ............. *H02G 3/121* (2013.01); *H02G 3/081* (2013.01)

(58) Field of Classification Search
CPC ........ H02G 3/126; H02G 3/125; H02G 3/081; H02G 3/123; H02G 3/121; H02G 3/12
See application file for complete search history.

(56) References Cited

U.S. PATENT DOCUMENTS

| | | | | |
|---|---|---|---|---|
| 5,434,359 A * | 7/1995 | Schnell | ..................... | H02G 3/18 220/3.6 |
| 6,737,576 B1 * | 5/2004 | Dinh | ..................... | H02G 3/14 174/53 |
| 7,214,875 B1 * | 5/2007 | Gretz | ..................... | H02G 3/126 174/53 |
| 7,855,338 B2 * | 12/2010 | Trader | ..................... | H02G 3/10 174/64 |
| 8,292,105 B1 * | 10/2012 | Gretz | ..................... | H02G 3/123 220/3.7 |
| 8,415,563 B1 * | 4/2013 | Shotey | ..................... | H02G 3/126 439/535 |
| 9,893,503 B2 * | 2/2018 | Geno | ..................... | H02G 3/086 |

* cited by examiner

*Primary Examiner* — Hoa C Nguyen
*Assistant Examiner* — Amol H Patel
(74) *Attorney, Agent, or Firm* — Alfred M. Walker

(57) ABSTRACT

An adaptable toggle electrical work boxes with removable locators are provided as electrical old work boxes which can be used as "stud no stud" boxes, with one or more built-in fastener assemblies for attachment to a stud or a pair of external pivoting toggle fasteners which can attach the box to a wall board even if the location is not adjacent to an interior wall stud. The round electrical work box with flanges for holding the box against a wall board, but also where the flanges are a plurality of arcuate flanges separated from each other, providing hand gripping spaces for gripping the electrical box for rotating it so that removable burs or pointed members can etch into the wall board along the circumference of the open edge of the round electrical work box.

1 Claim, 10 Drawing Sheets

ADAPTABLE TOGGLE BOXES

RELATED APPLICATIONS

This application is a continuation-in-part of application Ser. No., 17/475,100, filed Sep. 14, 2021, which application is incorporated by reference herein. Applicant claims priority therefrom under 35 USC § 120.

FIELD OF THE INVENTION

The present invention relates to versatile electrical toggle boxes for old work installation in existing walls.

BACKGROUND OF THE INVENTION

Electrical boxes are available for several types of applications. They can be rectangular electrical work boxes, having open interiors for one to multiple bays. The electrical work boxes can also be supplied as round electrical work boxes. Old work boxes are boxes which are installed in existing walls, whether made of sheetrock or other board material. It is desirable that the boxes be able to be installed in a wall, even if a stud is not close by, so that the electrical work box can be attached to wallboard as spaced away from any adjacent studs, hence a stud no stud box.

Among related prior art work boxes include U.S. Pat. No. 9,960,579 of Herth for a round electrical work box with a self-seating a shark type teethed edge for seating the box in a desired position in a wallboard, where the teeth are spun by a drill to create the round hole for the round box. The round box is held in place in a hole in the wallboard by an uninterrupted circumferential flange, and or a plurality of pivoting toggles clamps.

U.S. Pat. No. 7,554,032 of Herth describes an electrical work box with multi-mount features, such as removable external flanges that can hold the box steady during installation in the wall board, as well as a slide in interior wall with a fastener in positional register with a pre-drilled hole in an adjacent external wall Of the work box. In Herth '032, the electrical work box includes a mounting block removably mounted along an inner surface of a first side wall, where the mounting block has one or more angled screw guides for fastener screws in registry with one or more corresponding exit holes in said a side wall of the box. One or more rails are integrally molded on an inner surface of the first side wall for receiving the mounting block. The mounting block includes one or more slots for engaging said one or more rails to allow the mounting block to be inserted into the opening of said electrical box as needed.

U.S. Pat. No. 7,259,327 of Herth describes an electrical work box for single fasteners with removable external tabs. U.S. Pat. No. 5,600,093 describes a dual-purpose electrical work box with interior mounts for fasteners extending though the wall of the electrical work box.

Other prior art work boxes include commercially available boxes sold under the tradenames of Smart Box, the Arlington 1 box, the Allied Slider Box, or those sold as conventional old work toggle boxes.

However, the prior art old work boxes do not necessarily have the option of having one or more internal fasteners for mounting to a stud, in conjunction with or one or more toggles for mounting the box to a wall board in the absence of a nearby stud. Also, while Herth 9,960,579 has a central locator pilot guide pin for marking where the center of a round box should be located, it does not have removable central guide pins, which can be removed after their marking point function is achieved.

OBJECTS OF THE INVENTION

It is therefore an object of the present invention to provide adaptable toggle electrical work boxes with removable locators.

It is also an object of the present invention to provide electrical old work boxes which can be used as "stud no stud" boxes, with both a built-in fastener assembly of a plurality of fasteners, such as, for example one or more fasteners for attachment to a stud and a pair of external pivoting toggle fasteners which can attach the box to a wall board even if the location is not adjacent to an interior wall stud.

It is also an object of the present invention to provide "stud no stud" electrical work boxes with optional removable locator pilot guide pins for marking the center of the location for insertion of the box in a wallboard, where the removable locator pilot guide pins are physically breakable away from the surface body of the electrical work box, or are positioned upon removable spanning clips or side-in divider walls in the work box, so that the spanning bracket or slide-in divider wall with the removable locator pilot guide pin can be removed from the electrical work box.

It is also an object to provide a round electrical work box with flanges for holding the box against a wall board, but also where the flanges are a plurality of arcuate flanges separated from each other, providing hand gripping spaces for gripping the electrical box for rotating it so that burs or pointed members can etch into the wall board along the circumference of the open edge of the round electrical work box.

It is also an object of the present invention to provide a versatile electrical work box which can be used for lightweight switch installations, or, for heavy duty, braced light fixture installations.

It is also an object of the present invention to improve over the disadvantages of the prior art.

SUMMARY OF THE INVENTION

In keeping with these objects and others which may become apparent, the present invention comprises adaptable toggle electrical work boxes with removable locators, which have two features that stand out from the Smart Box, the Arlington 1 box, the Allied Slider Box and the conventional old work toggle box. These two features include the following:

1. an interior mounting design for a plurality of fasteners, such as, for example one or more fasteners, inclusive of the conventional toggles on the outer corners of the box, preferably three dimensional square or rectangular boxes with square or rectangular walls aligned together wall top, bottom rear and side walls, and an open front. These features allow for the box to be mounted to an existing sheet rock wall with or without the use of a stud. This box can be referred to as a "stud no stud" box. No other electrical manufacturer has thought of placing an interior mounting of a plurality of fasteners, such as, for example one or more screw fasteners and a conventional toggle in the same round, rectangular, square electrical work box product.

2. a removable local or pilot guide pin. The electrical work boxes of the present invention have a built-in pilot pin in the center of the box, whether it be a round, a square, a rectangular box, etc. This feature allows for a bullseye accuracy during installation. The guide pin makes it easy to line up the Smart Toggle box with existing switches and outlets.

ADVANTAGES TO THE ADAPTABLE TOGGLE ELECTRICAL WORK BOXES WITH REMOVABLE LOCATORS

First, the interior screw mounting feature can be used to increase weight capacity during the installation of a light fixture box. Most toggle boxes are designed to support a five-pound maximum weight support. The adaptable toggle electrical work boxes with removable locators are no different unless installed to a ceiling rafter, where a ceiling rafter has the potential of increasing the weight capacity by four times.

Second, catching a stud is ideal and a must (UL required) for the installation of the conventional prior art electrical work boxes. This is not required for the adaptable toggle electrical work boxes with removable locator products described herein, such as pilot guide pins and/or an array of circumferentially positioned pointed burrs positioned thereon. Sometimes during installation of the boxes mentioned above, the installer makes a miscalculation when cutting out the hole. The electrician finds themselves ¼-½ inch away from the stud required for proper install. At this point, a shim or filler may be installed before the above-mentioned boxes are put in place. If the gap between the hole and the mounting stud is too great a distance, then a bigger hole is needed in the wall to reach the stud. The adaptable toggle electrical work boxes with removable locators of the present invention simply use the toggle feature when a miscalculation of a stud location occurs.

Third, when both the fasteners, such as a single fastener, or a plurality of fasteners, such as, for example one or more screw mounting features and the toggle features are used simultaneously in one installation, there is no other box more secure than this.

Fourth, when traditional interior mounted boxes require two screws for installation, the adaptable toggle electrical work boxes with removable locators can accomplish the same result with one or more screws, because of the flanges around the outer edges of the box, so that the adaptable toggle electrical work boxes with removable locators can be installed faster by the electrician.

Improvements also include a divider wall which supports and locates a removable pilot guide pin.

In reference to the round box, a plurality of sharp burrs is provided along the exterior circumference of a round electrical work box, to make a perfect diameter mark on the wall, so that its marking can be followed by use of a hand-held key hole saw to cut out the perfect size circle for the box, with no prior pencil markings required, Removable clips that extend across the opening of the electrical work box contain the removable locator pilot guide pin that is used to initially mark the boxes position, wherein the improvement is that the clip holding the removable locator pilot guide pin is removable, after initial use, as opposed to being permanent in the Herth '579 self seating shark tooth round electrical work boxes.

Another improvement in the dual gang box which has a removable middle wall that supports the removable pilot pin extending up therefrom. Either the slide-in wall having the locator guide pin can be removed by sliding up and out of the electrical work box, or, if the box is intended as a dual gang partition walled box, the removable locator pilot guide pin itself can be cut off, leaving the central divider wall slid in place, separating the two gangs from each other.

A further improvement is that, in conjunction with exterior mounting toggles to hold the electrical work box to a wall board, the one or more fasteners can be fastened through one or fastener mounts which each are re-positionable within the electrical work box, by virtue of each fastener mount being inserted upon one or more tracks within a wall of the electrical work box, such as described in Herth '032, which may have an elongated open slot extending the length of the tracks, so that wherever the fastener mount with a screw mounting hole is located along the track and above the elongated slot, the screw can penetrate through each fastener mount and the open slot positioned thereunder, into an adjacent stud for fastening the electrical box in place within the stud.

Another improvement is that, in conjunction with exterior mounting toggles to hold the electrical work box to a wall board, the wall of the electrical box containing the one or more fastener mounts, can be detachable from the electrical work box and replaced by another wall with a different pattern of wall fastener mounts, such as suggested in multi-mount features of Herth '032. For example, if one fastener mount is required, being aligned on the left side of the removable and replaceable wall, and the current wall contains a fastener mount on the right side of the wall, the current wall with the right sided fastener mount can be replaced with the new wall where the fastener mount is aligned on the left side of the wall. Likewise, if a center aligned wall fastener mount is required, rather than one or more fastener mounts on either or both sides of the wall, then the walk with the center aligned fastener mount can be slid or attached by clamps or tracks into place in the electrical work box. Furthermore, if the removable and replaceable wall contains a single fastener mount, and it would be desirable to have a wall with two more fastener mounts for better strength against the stud, then the removable and replaceable wall with a single aligned fastener mount can be replaced with the wall with two or more fastener mounts. While the removable and replaceable wall can be slid in place upon one or more tracks located at corners of adjacent opposite walls, the removable and replaceable wall can be friction fit with other fasteners or hook and loop fasteners.

For the round box there are two additional improvements:

First, the back end of the round box has triangular pointed "burrs" circumferentially extending up from the box. The circular flange that would normally be continuous, like that shown in Herth '579 seal seating box is really several spaced apart, circumferentially extending arcuate flanges, leaving spaces for the user's fingers to grab the box at the opposite end (the open end) so that the user can depress the burs into the sheetrock, and the user can rotate the box so that the burs leave arcuate impressions in the sheet rock, for determining the location of the circular hole to be cut out, for insertion of the round box in place in the sheetrock (being held by one or more fasteners, such as a plurality of fasteners, for example two or more internal mounts, if a stud is available, or by the a plurality of fasteners, such as, for example, one or more pivoting toggle screw plates, that pivot when the screws are tightened, thereby grabbing over the sheetrock or other wall board to hold the adaptable toggle electrical work box with removable locators in place.

Furthermore, the round electrical work box can be adapted with exterior mounting toggles, in conjunction with one or more interior fastener mounts, where the interior mounts are slidable, or removable and replaceable, with slide-in walls engageable with tracks, to accommodate slide in fastener mounts as noted, for the aforementioned electrical work boxes with rectangular or square configurations, or where portions of the round wall can have arcuate removable and replaceable sections, similar in scope to the aforementioned removable walls with different positioned fastener mounts.

BRIEF DESCRIPTION OF THE DRAWINGS

The present invention can best be understood in connection with the accompanying drawings. It is noted that the invention is not limited to the precise embodiments shown in the following drawings, in which.

DETAILED DESCRIPTION OF THE EMBODIMENTS

Figure 1:
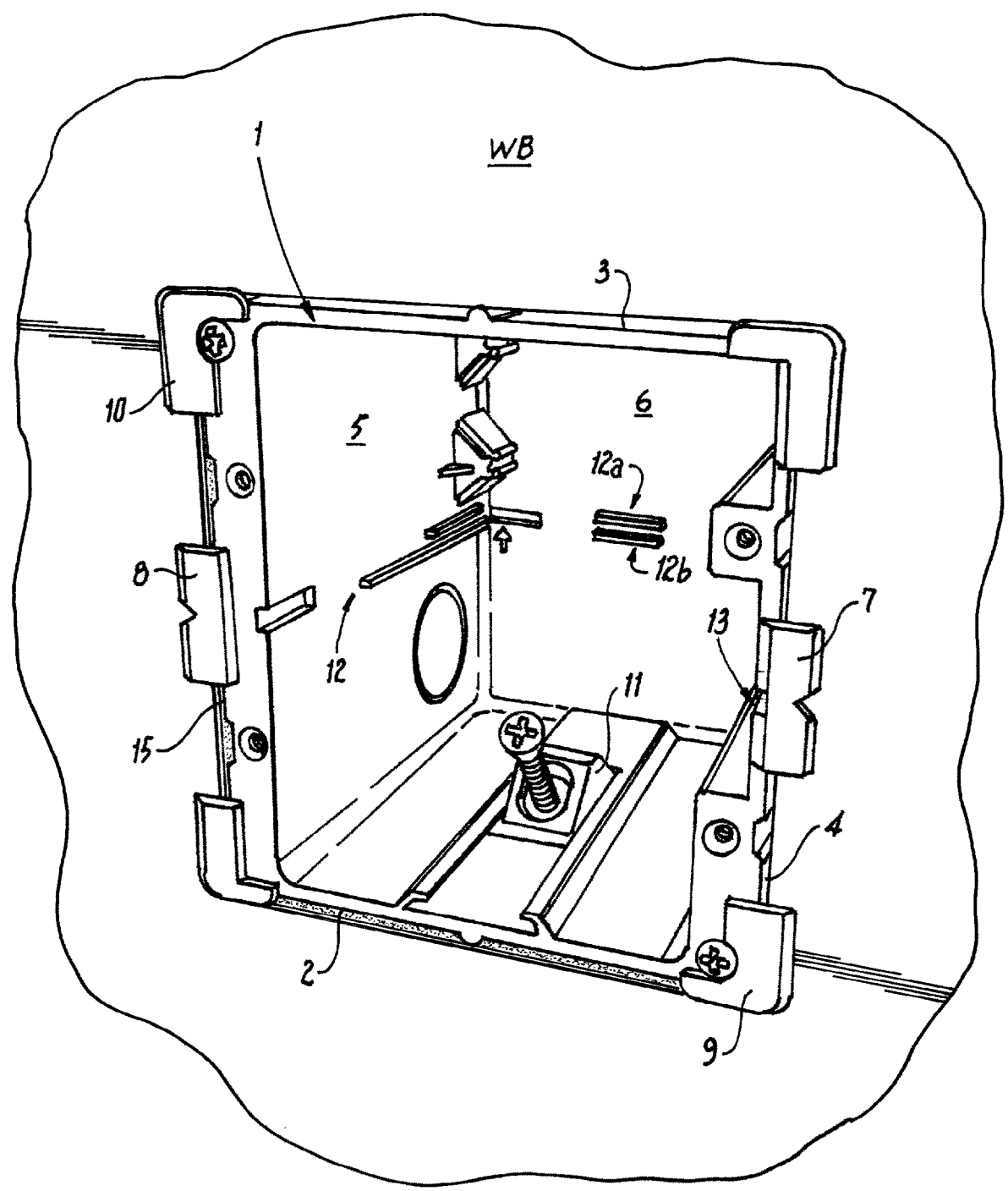
FIG. 1 is a front perspective view of a square electrical box of this invention.
Figure 4:
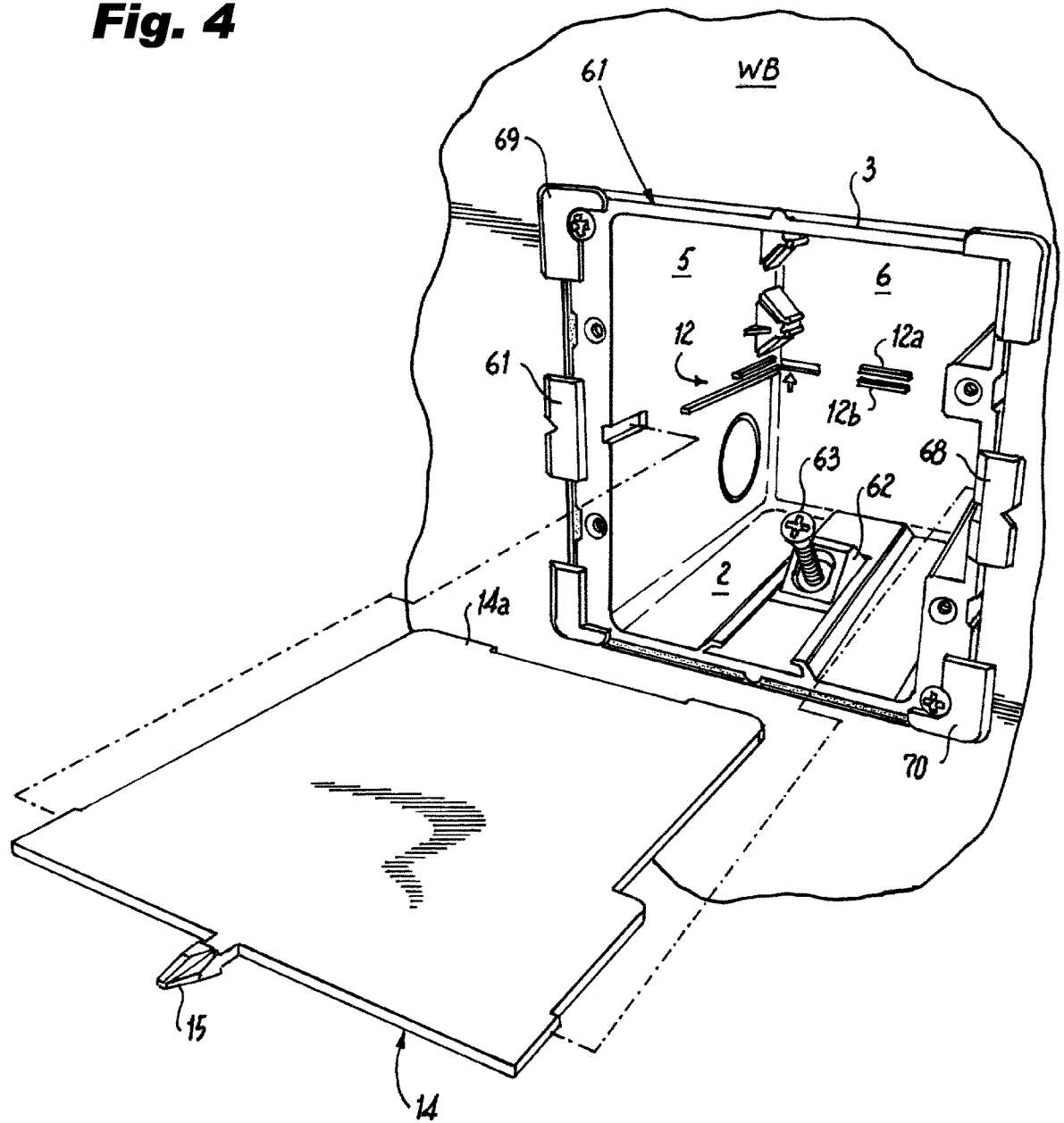
FIG. 4 is an exploded front open view of a square electrical box of FIG. 1, shown with a slide-in, removable divider wall panel, having a pilot guide pin located centrally on a distal edge of the slide-in, removable divider wall panel.
Figure 5:
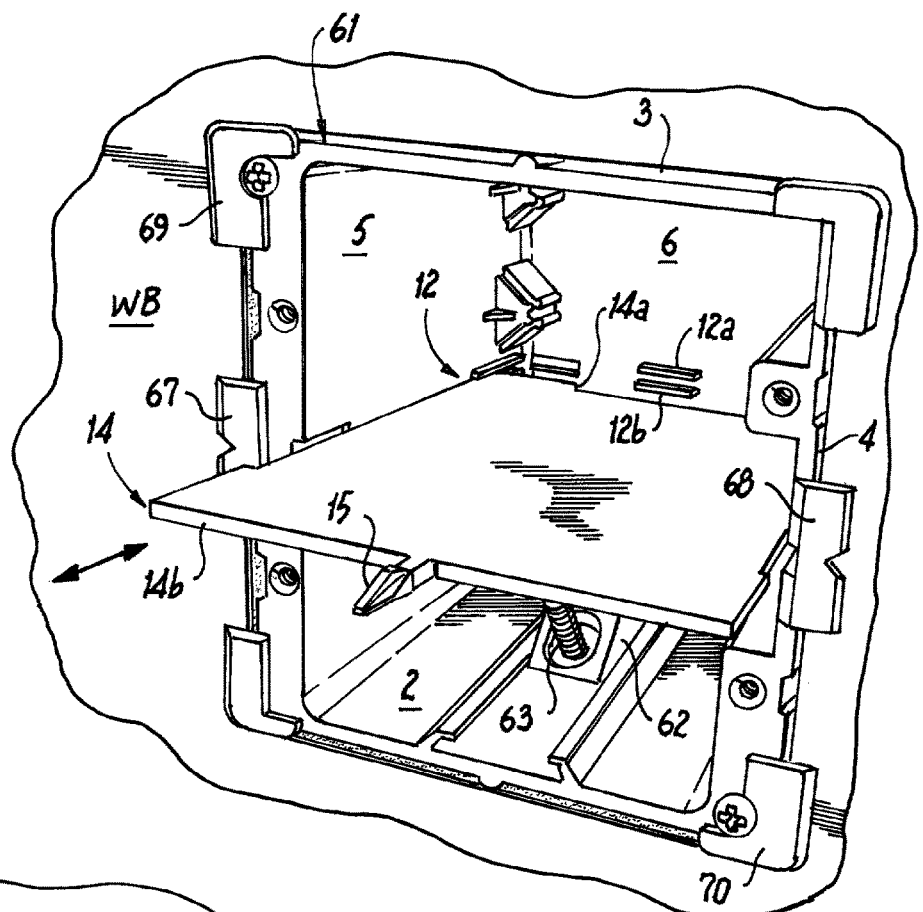
FIG. 5 is a perspective front open view showing the installation of the slide-in, removable divider wall panel, having the pilot guide pen, within opposite pairs of slots between track elements located on opposite inside walls of the electrical work box of FIG. 4, providing the electrical work box with separated areas in a two-gang adaptable toggle electrical work box configuration, wherein the directional arrows shown depict opposite slide in or slide out directions of the slide-in, removable divider wall panel, having the pilot guide pin.

FIG. 1 shows an open ended square electrical work box 1, having four walls including side wall 2, opposite side wall 3, top wall 4 and bottom wall 5, and a contiguous rear wall 6, to be inserted into a hole in a wall board WB, as also shown in FIG. 5. The box can be inverted, so that wall 4 can be a bottom wall and wall 5 can be a top wall, so that the side walls 2 and 3 are also inverted. In special occasions, where the box is to be attached above or below a horizontally extending stud, instead of a conventional vertically extending stud, the wall 2 of the electrical work box 1 can include a single fastener mount 11 for accommodating fastener 11a, such as a screw, therein. Electrical work box 1 can have a top or bottom wall, and the other walls 4 and 4 being side walls, where each of the walls 2, 3, 4 and 5 are connected to a common rear wall 6. The electrical work box 1 shown in FIG. 1 includes flanges 7 and 8 and screw holes, as well as a pair of pivoting toggles 9 and 10 for attaching the box 1 to a hole in a wall board WB, in the event an interior mount cannot be provided to a stud. A single interior fastener mount 11 for fastener 11a, such as a screw, is shown. The square box has two opposite slots 12 and 13 in the side walls 4 and 5 for insertion of a slide-in removable panel 14, shown in FIGS. 4, 5 and 5A, to convert the single gang electrical box 1 to a two-gang electrical work box 61, by providing the slide-in separating wall 14 therebetween. To stabilize the wall panel 14, the rear wall 6 includes one or more pairs of raised bosses 12a and 12b, providing a track within which the rear bottom edge 14a of wall panel; 14 is slid into. Additionally, the wall panel 14 can also be a temporary wall, which is removable, having a center point extending thereof with a centrally located removable locator pilot guide pan 15, for positioning the electrical work box 1 and placing the guide pin 15 into the location where the center of the electrical work box 1 should be located in the wall board WB. As a further option, the removable locator pilot guide pin 15 itself can optionally be removable after use from the top of the wall panel 14, leaving the center slide-in wall 14 dividing the electrical work box 1 into a two-gang box.

Figure 2:
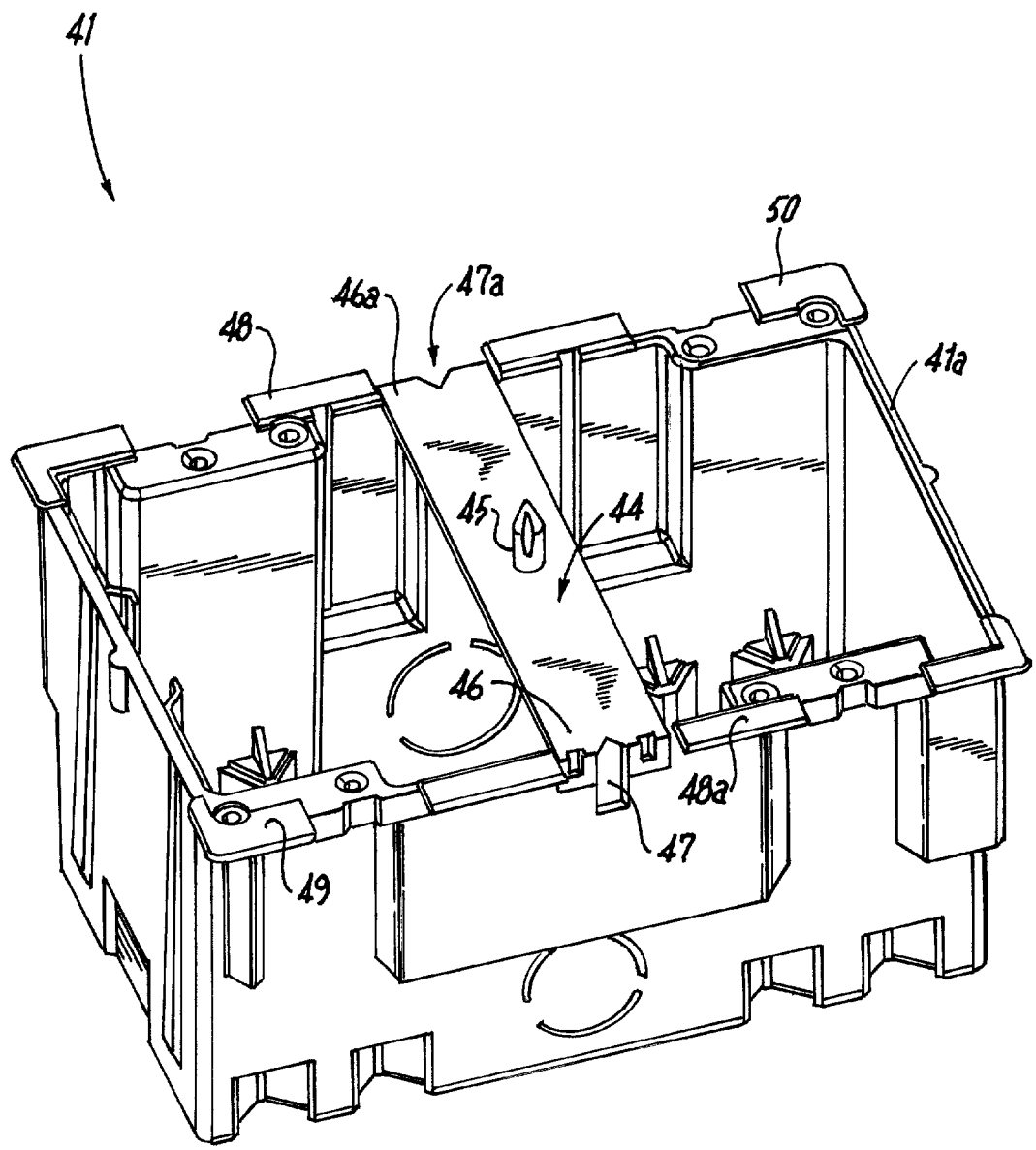
FIG. 2 is a front perspective view of a rectangular electrical work box, showing a removable clip with a removable pilot guide pin.
Figure 3:
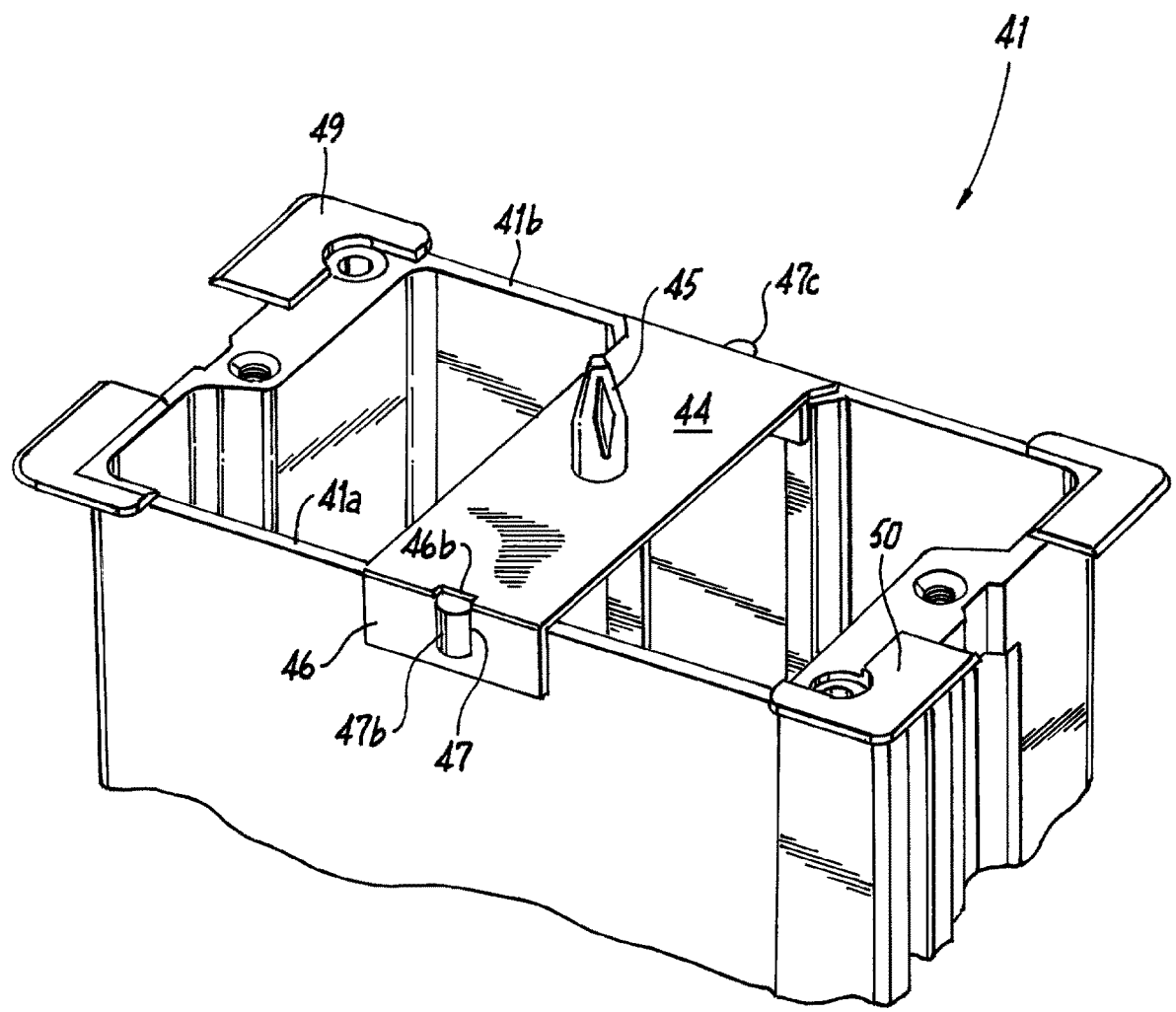
FIG. 3 is a close-up detail view of the clip with the removable pilot guide pin, as in FIG. 2, of an electrical box of this invention.

FIG. 2 is a perspective view of an alternate embodiment for an open ended rectangular-shaped electrical work box 41, having a plurality of pivoting toggle fasteners, such as a pair of pivoting toggle fasteners 49 and 50, which are screwed in place and which pivot upon the movement of the screw being turned. Auxiliary flanges 48 and 48a are also provided along the top circumference walls 41a, 41b of electrical work box 41 to temporarily hold the work box 41 in place in an opening of wall board WB. In the middle of the front opening of the electrical work box 41 there is provided a crosswise extending clip 44, reaching across the front opening of the electrical box 41, in a bracket-like fashion, having at each end protruding, downward extending cantilevered connector distal male elements 46, 46a, which are connectable to, or insertable in, corresponding female receptacles 47, 47a. The female receptacles 47, 47a can also be provided with optional outwardly extending nibs 47b and 47c extending out therefrom, as shown in FIG. 3 herein, to engage optional apertures within the downwardly extending cantilevered protruding distal connector male elements 46, 46a, The connected clip 44 extends along respective extending edges 41a and 41b of electrical work box 41, so that the clip 44 can be easily removed after the locator pilot guide pin 45, which extends upward in the middle of clip 44, has been used to mark the location of the center of the box 41, upon wallboard WB. Alternatively, the removable locator pilot guide pin 45 itself can be removed from the clip 44, leaving the clip 44 positioned in the middle of the open end of electrical work box 41 as a side-to-side bracket, without pilot guide pin 15 extending upward therefrom, if desired.

FIG. 3 shows the open ended electrical work box with a removable pointed removable locator pilot guide pin 45 on top of the removable clip 44, where the downward cantilevered protruding connector distal male elements 46 and 46a engage female receptacles 47 and 47a, which may each optionally have a protruding nib 47b and 47c, extending through holes 46b and 46c of the connector elements 46 and 46a of clip 44 at the top sides of the exterior walls 41a and 41b of the electrical work box 41. Two of the pivotable toggles 49 and 50 are also shown.

In other words, as shown in FIG. 2, the protruding, cantilevered connector joint male elements 46, 46a of electrical work box 41 can be inserted into female receptacles 47 and 47a, or, as shown in FIG. 3, the protruding, cantilevered connector male elements 46 and 46a can have apertures at the downward distal ends thereof, engageable with extending nibs 47b and 47c of female receptacles 47 and 47a of electrical work box 41.

FIG. 4 is an exploded front view of another embodiment for an open-ended square, or rectangular, electrical work box 61, formed by rear wall 6, top wall 3, bottom wall 2, and side walls 4 and 5, each at perpendicular angles to an adjacent wall. FIG. 4 also shows the electrical work box 61 with a single fastener screw 63 in a single fastener mount 62 at a bottom edge thereof, with the screw 63 extending therethrough, for attachment of the electrical work box 61 to a stud. However, if the stud is not within the vicinity of the work box 61, rather than adding a plug to the wood to extend it closer, the open ended electrical work box 61 can be held in place by the two pivoting toggles 69 and 70, which are shown with screws for grasping against the edge of the wall board WB, having the cutout hole for insertion therein of the work box 61, as well as other auxiliary flanges 67 and 68, which may be removable, or not, for holding the electrical work box 61 in place in wallboard WB.

FIG. 4 also shows the open-ended electrical work box 61 with a slide-in, removable divider wall panel 14, having a pilot guide pin 15 located centrally on a distal edge 14b of the slide-in, removable divider wall panel 14. Slide-in, removable wall panel 14 slides into electrical work box 61 box within opposite slots 12 and 13 located longitudinally between track elements located on opposite inside walls of the electrical work box 61 of FIGS. 4, 5 and 5A. The distal edge 14a of slide-in wall divider 14 is held in place within a further track on the inside rear wall 6 formed by parallel bosses 12a and 12b.

FIG. 5 is a perspective front view of open-ended electrical work box 61, showing a typical two-gang box 61, (formed from a box similar to electrical work box 1 of FIG. 1 with divider wall panel 14 with removable locator pilot guide pin 15) having top wall 2, side walls 4 and 5 and bottom wall 3, and a rear wall 5. The divider wall panel 14 is slid into opposite longitudinally extending slits 12 and 13 in the top and bottom walls, and corresponding track bosses 12a and 12b located on the rear wall 6 of box 1 or 61, so that the wall panel 14 can be slid in place, having the removable locator pilot guide pin 15 attached thereto, for marking the position of the box 1 or 61 in the wallboard WB. After this installation, either the divider wall 14 can be optionally removed if the entire box 1 or 61 should be a single gang box, or if desired as a two-gang box, the divider wall panel 14 can be left slid in place within electrical work box 1 or 61, and the removable locator pilot guide pin 15 can be removable from the top edge of slide-in wall panel 14.

Figure 6:
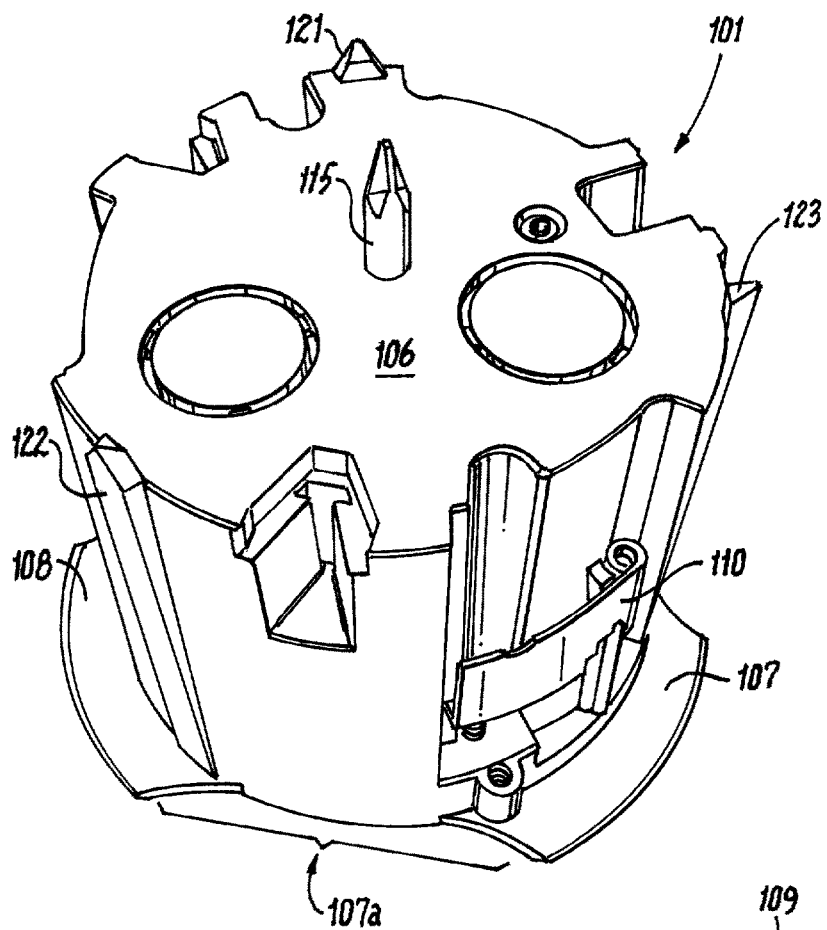
FIG. 6 is a rear perspective view of a round electrical work box of this invention, shown with a removable, break-off pilot guide pin and with a plurality of spaced-apart, circumferentially located pointed burrs extending up from rear of the round electrical work box, and a plurality of spaced apart flanges provided on the front edge of the round electrical work box, for stabilizing the round electrical work box in place within an opening in a wall board, and wherein void spaces are provided between the spaced apart flanges at the open edge of the round electrical work box, for a worker to be able to manually hold the round electrical work box with the rear edge thereof placed adjacent to the wall board, so that the pointed burrs can mark arcuate segments indented within the wall board, to mark a circumferential line where an open hole is to be drilled out from the wall board, for placement of the round electrical work box securely in place therein.
Figure 7:
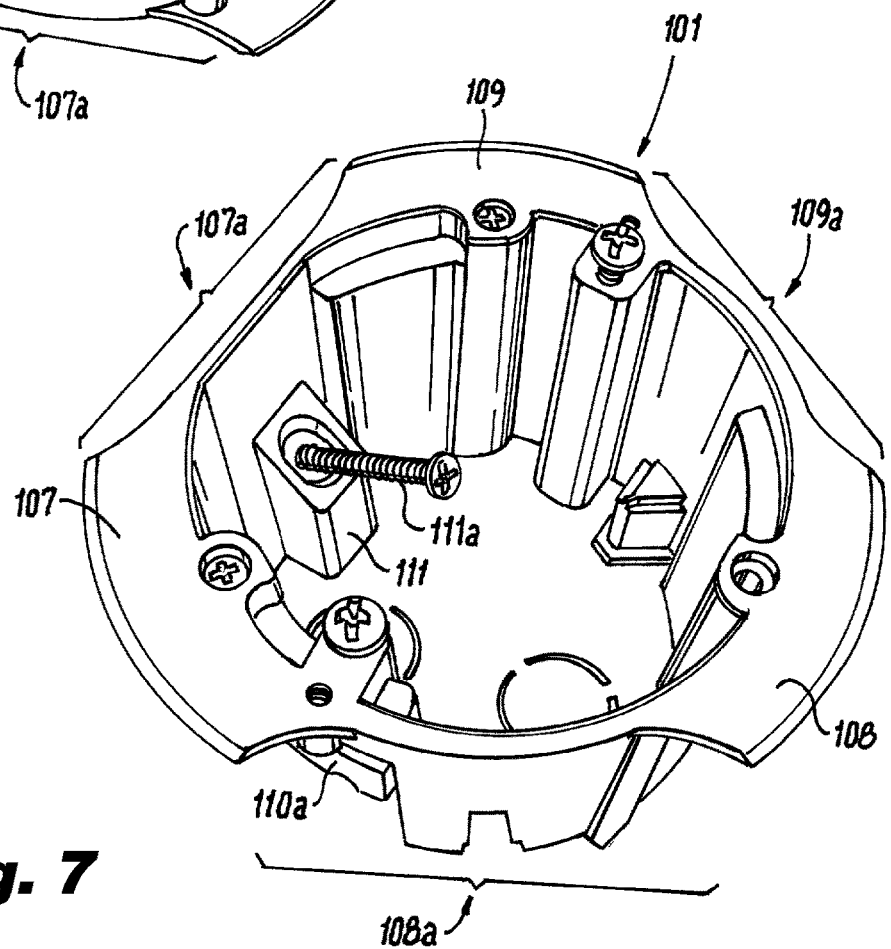
FIG. 7 is a front perspective view of the round electrical work box of FIG. 6.

FIG. 6 is a rear perspective view of another alternate embodiment for a round electrical work box 101 of the present invention, having a pair of pivoting toggles 110, 110a, for holding the box 101 in place in a circular cut-out in wall board WB. FIGS. 6 and 7 also show a set of circumferential extending flanges 107, 108 and 109 for holding the round electrical work box 101 in place against the wallboard WB, which has a cut-out hole for installation of the circular electrical work box 101. However, as also shown in FIGS. 6 and 7, the circumferential flanges surrounding the box are really a plurality of; preferably three arcuate flanges 107, 108 and 109, which respective flange of the flanges 107, 108, 109 are each respectively spaced apart from the other two flanges, leaving three open gripping void spaces indicated by brackets 107a, 108a and 109a, for the fingers of the installer to hold the round electrical work box 101 in place. A removable locator pilot guide pin 115 extends rearward from the rear wall 106, and which pilot guide pin can be positioned on the wallboard WB before drilling the hole. The removable locator pilot guide pin 115 locates the center of the hole for insertion of the circular box 101. The rear wall 106 also has exterior longitudinally extending extensions, extending from the open front face of the round electrical work box 101 to the rear wall 106 thereof, with respective distal ends of the extensions each having pointed burrs 121, 122 and 123, preferably three equally-distant burrs 121, 122, 123, extending upward from the rear wall 106 of the electrical work box 101, so that when the installer grabs the round electrical work box 101 with his or her fingers deployed in the void spaces 107a, 108a and 109a, shown with bracket view lines indicating the width of the respective void spaces 107a, 108a and 109a located between the three arcuate flanges 107, 108 and 109, and with the fingers of his or her hand, in the void spaces 107a, 108a and 109a, the installer manipulates the outwardly extending pointed burrs 121, 122 and 123 by rotation. The burrs 121, 122 and 123 of round electrical work box 101 can therefore be rotated by the user's hand to mark arcuate circumferential portions of the round circumference of the hole to be drilled in the wall board WB, for insertion of the round electrical work box 101 therein.

FIG. 7 is a front perspective view of the round electrical box of FIG. 6, showing the arcuate flanges 107, 108 and 109, and the void spaces depicted by bracket view lines 107a, 108a and 109a provided therebetween, for the insertion of the hand and fingers of the user. FIG. 7 also shows a single interior mount 111 for a fastener 111a, if the round box 101 is to be fastened into a stud, but if not, the round box can be held in place by a pair of the pivoting toggles 110, 110a to hold the round box 101 in place.

Figure 5A:
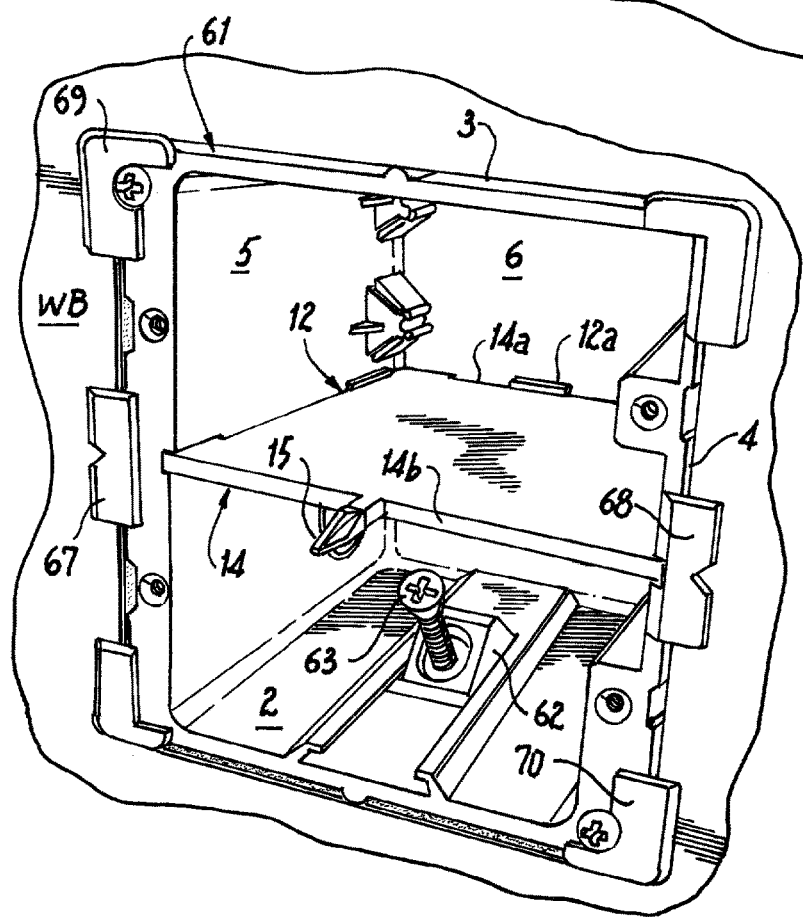
FIG. 5A is a perspective front open view depicting the slide-in, removable divider wall panel, having the pilot guide pin, shown installed within the opposite pairs of slots between track elements located on opposite inside walls of the electrical work box of FIGS. 4 and 5.

Although not shown, it is known that clips similar to clips 44 with guide pins 45 of FIGS. 2 and 3 can be provided at the open end of the round box 101, or a slide in wall panel 14 with removable locator pilot guide pin 15 of drawing FIGS. 4, 5 and 5A, can optionally be provided for round box 101 of FIGS. 6 and 7, where the wall panel slides within slots similar to slots 12 and 13 of FIGS. 1 and 5, with optional boss tracks 12a, 12b, Likewise, although the pointed burrs 121, 122 and 123 are suited for rotation of the round electrical work box 101 of FIGS. 6 and 7, optionally similar burrs could be provided along the front edges of the walls of square or rectangular boxes 1, 41 or 61 of FIGS. 1-5A, for supplemental marking of the locations for drilling square or rectangular holes in wall board WB for insertion of boxes 1, 41 or 61 therein.

Figure 8:
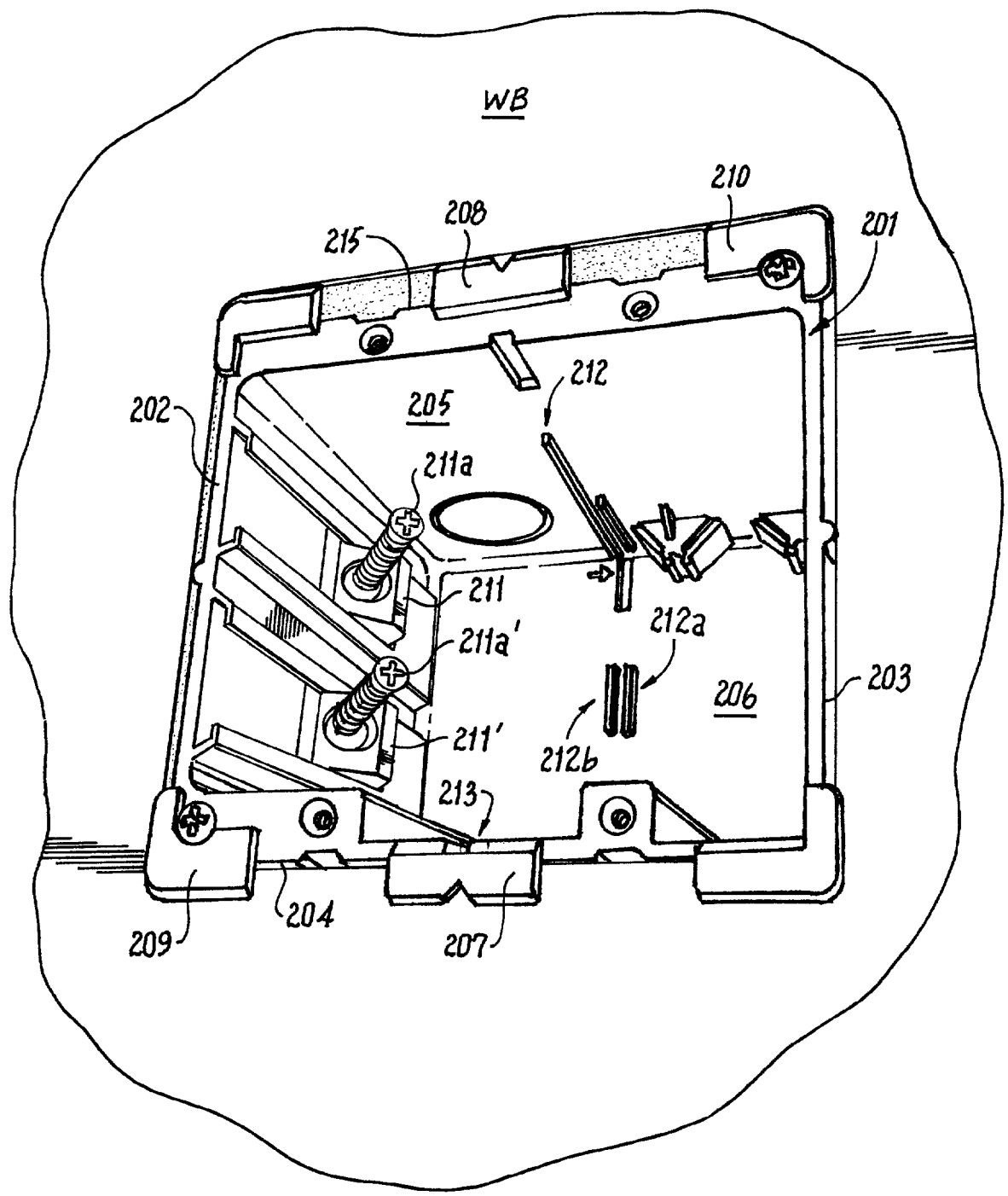
FIG. 8 is a front perspective view of an alternate embodiment for a square or rectangular electrical work box of this invention, where a plurality of fasteners, such as, for example, two or more screw fastener mounts are provided, and a plurality of pivotable toggles are provided for grasping wall boards for holding the electrical box in place, with or without the plurality of fasteners, such as, for example two or more interior screw fastener mounts.

FIG. 8 shows an alternate embodiment for a square electrical box 201 of this invention, where a plurality of fasteners, such as, for example two or more screw fastener mounts 211, 211' are provided with screws 211a, 211a' for mounting electrical box 201 to a stud behind a wall board WB, in conjunction with a plurality of pivotable toggles 209, 210, which are provided for grasping wall boards WB for holding the electrical box 201 in place, with or without the plurality of fasteners, such as, for example two or more interior screw fastener mounts 211, 211'. FIG. 8 also shows the open ended square electrical work box 201, having four walls including side wall 202, opposite side wall 203, top wall 204 and bottom wall 205, and a contiguous rear wall 206, to be inserted into a hole in a wall board WB. The box can be inverted, so that wall 204 can be a bottom wall and wall 205 can be a top wall, so that the side walls 202 and 203 are also inverted. In special occasions, where the box is to be attached above or below a horizontally extending stud, instead of a conventional vertically extending stud, the side or bottom wall 202 with a plurality of fasteners, such as, for example, two or more fastener mounts 211, 211' for accommodating fasteners 211a, 211a', such as screws, therein. Electrical work box 201 can have a top or bottom wall, and the other walls 204 and 205 being side walls, where each of the walls 202, 203, 204 and 205 are connected to a common rear wall 206.

The electrical work box 201 shown in FIG. 8 includes flanges 207 and 208 and screw holes, as well as two or more pivoting toggles 209 and 210 for attaching the box 201 to a hole in a wall board WB, in the event an interior mount cannot be provided to a stud.

In FIG. 8, the aforementioned pair of interior fastener mounts 211, 211' for fastener 211a, 211a' such as screws, are shown, where, optionally, the square box optionally has two opposite slots 212 and 213 in the side walls 204 and 205 for insertion of an optional slide-in removable panel, similar to that shown in FIGS. 4, 5 and 5A, to convert the single gang electrical box 1 to a two-gang electrical work box 61, by providing the slide-in separating wall 14 therebetween. To stabilize the slide-in wall panel 14, the rear wall 206 includes one or more pairs of raised bosses 212a and 212b, providing a track within which the rear bottom edge 14a of wall panel; 14 is slid into. Additionally, as shown in FIGS. 4 and 5, the wall panel 14 can also be a temporary wall, which is removable, having a center point extending thereof with a centrally located removable locator pilot guide pan 15, for positioning the electrical work box 201 and placing the guide pin 15 into the location where the center of the electrical work box 201 should be located in the wall board WB. As a further option, the removable locator pilot guide pin 15 itself can optionally be removable after use from the top of the wall panel 14, leaving the center slide-in wall 14 dividing the electrical work box 201 of FIG. 8 into a two-gang box.

It is also noted that similar sets of a plurality of fasteners, such as, for example, two or more interior fastener mounts 211 and 211' shown in FIG. 8, can also be deployed in square or rectangular electrical work boxes 41 of FIGS. 2, 3, 4, 5, 5a in similar configuration placements (not shown).

Additionally, similar sets of a plurality of fasteners, such as, for example two or more interior fastener mounts 211 and 211', shown in FIG. 8, can alternatively be deployed in the round electrical work box 201 of FIGS. 6 and 7 in similar configuration placements (not shown).

Figure 9:
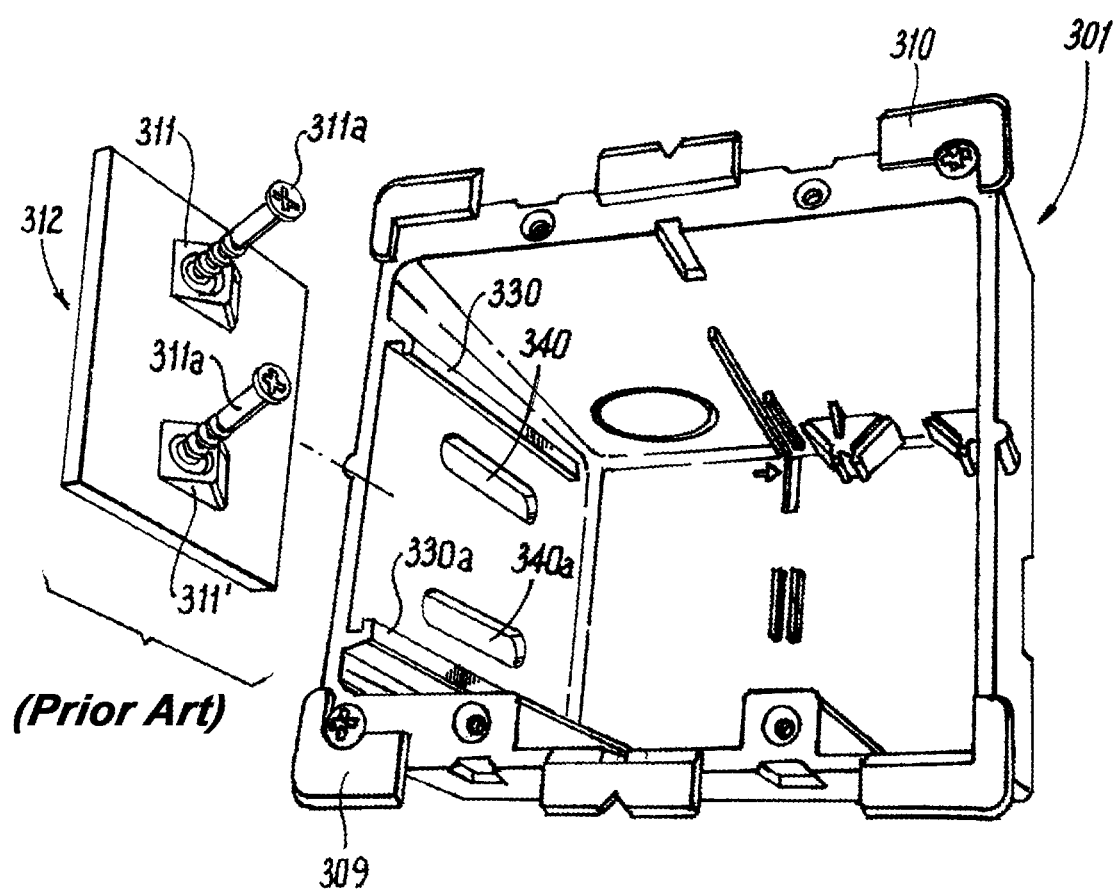
FIG. 9 is an alternate embodiment for a square or rectangular electrical work box, in conjunction with exterior toggle mounts, where one or more screw fastener mounts are adjustably positioned at selected positions within the electrical work box.

FIG. 9 shows an alternate embodiment for an electrical work box 301 with a further improvement is, in conjunction with the use of exterior toggle mounts for attaching the box to wall boards in the absence of an adjacent stud, that the one or more fasteners 311a can be fastened through one or fastener mounts 311, 311', etc., wherein each fastener mount 311, 311', etc. is re-positionable within the electrical work box 301, by virtue of each fastener mount 311, 311', etc. being inserted slidably upon one or more tracks 330, 330a within a wall of the electrical work box 301, such as in Herth '032, which may have an elongated open slot 340 extending the length of the tracks 330, 330a, so that wherever the fastener mount 311, 311' etc. with a screw mounting hole is located at selected positions along a single track 330 or multiple tracks 330, 330a and above the elongated slot 340, the screw can penetrate through each fastener mount 311, 311' and the open slot 340 positioned thereunder, into an adjacent stud for fastening the electrical box 301 in place within the stud.

Figure 10:
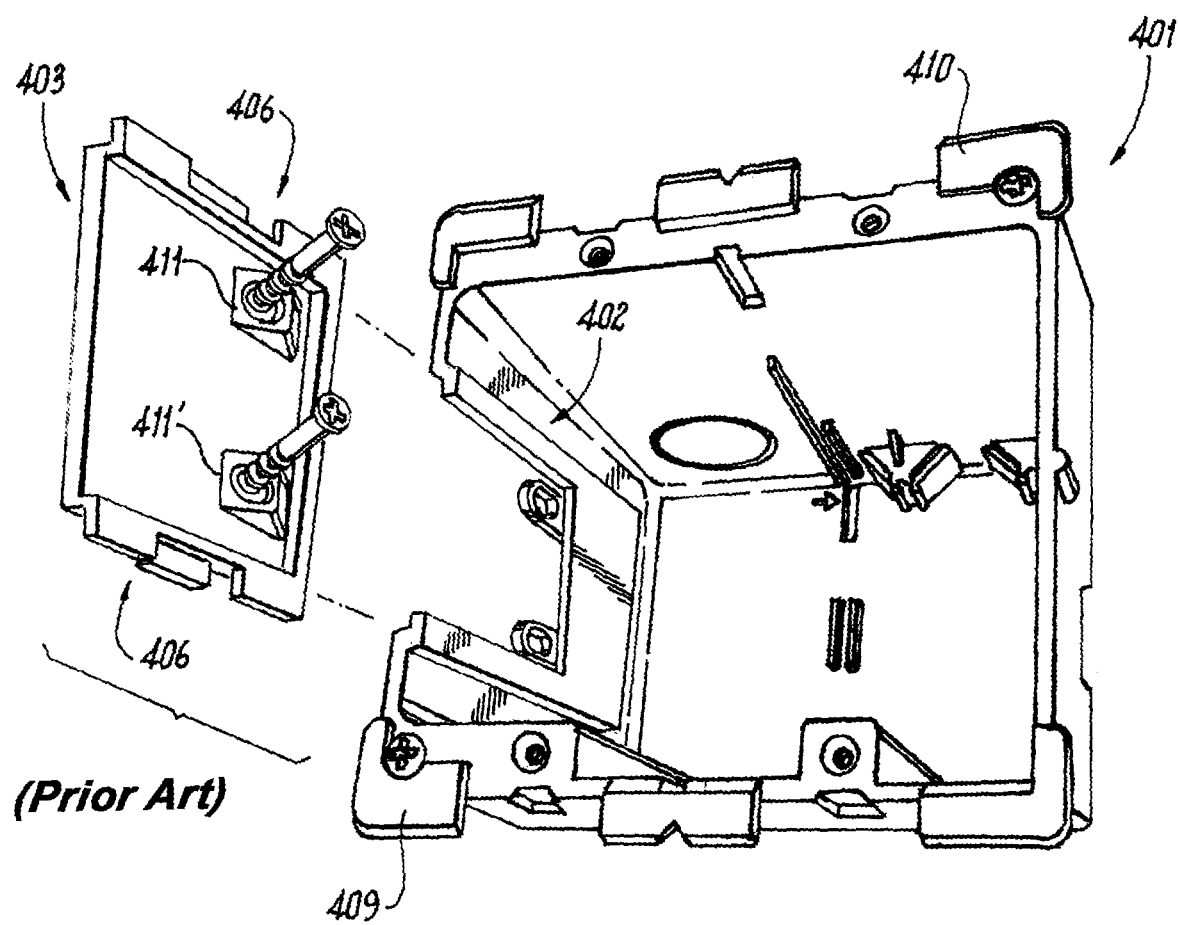
FIG. 10 is a further alternate embodiment for an electrical work box, in conjunction with exterior toggle mounts, where the wall containing the fastener mounts can be removable and replaceable by a wall with fastener mounts of differing locations and/or quantities of fastener mounts.

FIG. 10 shows another improvement is that, in conjunction with exterior toggle mounts for mounting the box in the absence of an adjacent building wall stud, the wall 402 of the electrical box 401 containing the one or more fastener mounts 411, 411' etc., can be detachable from the electrical work box 401 having toggles 409, 410, and replaced by another wall 403 with a different pattern of wall fastener mounts 411, 411', such as suggested in Herth '032. For example, if one fastener mount 411 is required being aligned on the left side of a removable and replaceable wall 403, and the current wall 402 contains a fastener mount 411' on the right side of the wall 402, the current wall 402 with the right sided fastener mount 411 can be replaced with the new wall 403 where the fastener mount 411' is aligned on the left side of the wall 403. Likewise, if a center aligned wall fastener mount is required, rather than one or more fastener mounts on either or both sides of the wall 404, then the wall 404 with the center aligned fastener 412 mount can be slid or attached by clamps or tracks into place in the electrical work box 402. Furthermore, if the removable and replaceable wall 404 contains a single fastener mount 412, and it would be desirable to have a wall 402 with two more fastener mounts 411, 411' for better strength against the stud, then the removable and replaceable wall 404 with a single aligned fastener mount 412 can be replaced with the wall 402 with two or more fastener mounts 411, 411'. While the removable and replaceable wall 402, 403 pr 404 can be slid in place upon one or more tracks 460 located at corners of adjacent opposite walls, the removable and replaceable wall 402, 403 or 404 can be friction fit with other fasteners or hook and loop fasteners, known to those skilled in the art.

Figure 11:
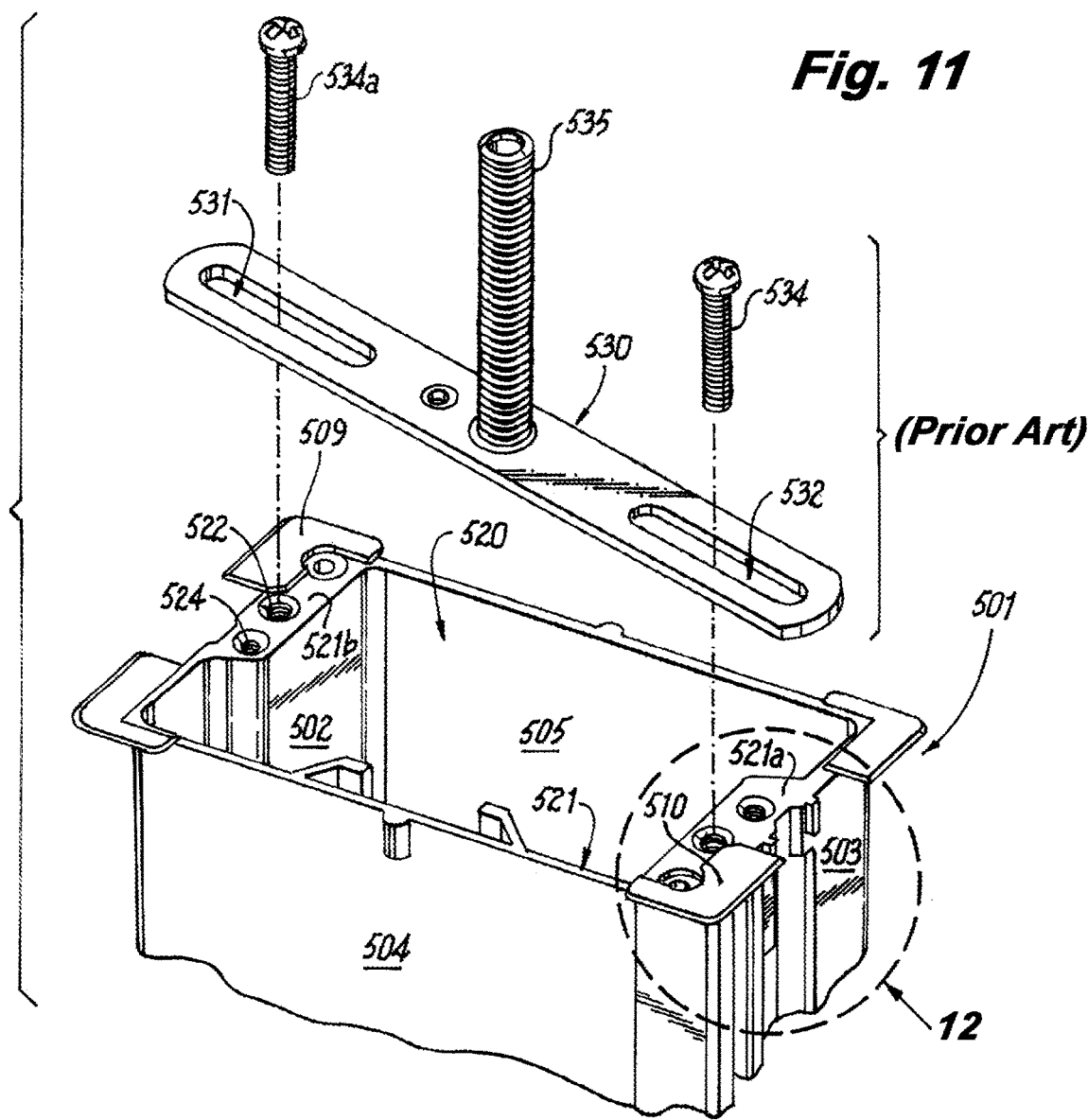
FIG. 11 is another alternate embodiment for a versatile electrical work box adapted to support lightweight switches or heavy light fixtures.
Figure 12:
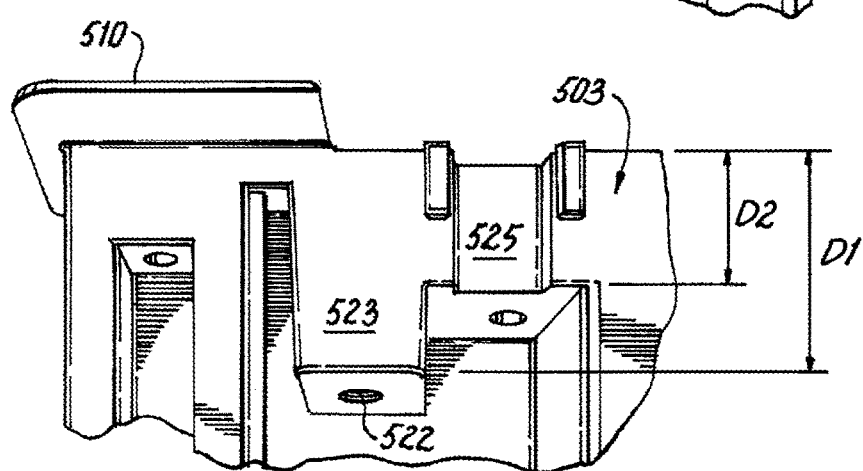
FIG. 12 is a close-up detail view of the portion of the versatile electrical work box as in FIG. 11, taken inside of circular dashed view line circle "12" of FIG. 11.

FIGS. 11 and 12 show an alternate embodiment for a versatile electrical work box 501 adapted for supporting lightweight switches or heavier light fixtures. For example, with or without exterior toggles for mounting a box to a wall board in the absence of an adjacent building stud, if the load in the box is lightweight, such as a switch (not shown) the box is to be mounted by a fastener through a standard 6/32 inch diameter hole. But if a heavier light fixture (not shown) is to be mounted with 8/32 inch diameter screws, pursuant to UL requirements, with a diagonally extending support brace 530 extending across the open mouth of the box, as shown in the exploded view of FIG. 11 as "PRIOR ART", the brace 530 is used in the industry to attach the heavier lighting fixtures to the electrical box 501, which includes two shorter sides of the electrical work box 501 as 502 and 503, and the longer sides 504 and 505. Two corner toggles 509 and 510 may be employed for wall board attachment. The electrical work box 501 also includes the open-end cavity 520, with the overall peripheral edge as 521, the right-side surface with the two holes as 521*a*, 521*a* and the left side surface with the two holes as 521*b*, 521*b*, where the larger 8/32" hole 522 is used for where the electrical work box supports the heavy electrical light fixture (not shown), and the left side smaller 6/32" hole 524 is used where the electrical work box 501 contains a lightweight switch (not shown), not needing the 8/32 inch fastener or the brace.

Brace 530 is diagonally placed with elongated slots 531 and 532 and the upright threaded member 535, to engage the heavier light fixture (not shown).

With respect to the side view of FIG. 12, the larger, deeper abutment 523 supports the 8/32" hole and the shallower, smaller abutment 525 supports the smaller 6/32" hole. Dimension D1 is for the depth of abutment 523 and dimension D2 for the depth of smaller abutment 525.

Therefore, the electrical work box of the present invention is a "stud no stud" electrical work box with a built-in interior fastener assembly with one or more fixed or slidable or removable fastener mounts and an exterior toggle assembly for attachment to a stud, or attached to a wall board panel, even if the electrical work box is not adjacent to an interior wall stud.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A rectangular electrical box comprising:
   four side walls and a bottom wall forming an open end surrounded by upper edges of said side walls;
   a bottom portion of said electrical box adapted to extend into an opening in a wall board;
   a plurality of spaced flanges extending outwardly from said upper edges of said side walls having inner surfaces adapted to be flush against an outer surface of said wall board;
   a pair of 8/32 inch and 6/32 inch holes for fasteners on each side of a top edge of said box for mounting the electrical work box next to a stud;
   at least two of said spaced flanges having toggle members being rotatable to engage an inner surface of said wall board for locking said electrical box onto said wall board when said electrical box is not adjacent a stud or both for greater security, said toggle members being actuated by threaded screw members rotated by slotted heads located in respective spaced flanges;
   a brace supporting a light fixture to said electrical box, said brace extending across said opening from one wall to an opposite wall; and
   a plurality of threaded fasteners insertable within axially aligned longitudinal slots and into each respective 8/32 inch hole extending through an abutment having a first depth longer than the depth of a shorter abutment accommodating a 6/32 inch fastener extending therethrough and supporting said box to a stud where said box supports a switch therein.

* * * * *